(12) United States Patent
Dowd et al.

(10) Patent No.: US 6,931,194 B2
(45) Date of Patent: Aug. 16, 2005

(54) METHODS AND APPARATUS FOR FORMING AN OPTICAL CABLE SPLICE

(75) Inventors: Edward M. Dowd, Madison, CT (US); Robert Winiarski, Bristol, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 10/730,716

(22) Filed: Dec. 8, 2003

(65) Prior Publication Data

US 2005/0123262 A1    Jun. 9, 2005

(51) Int. Cl.$^7$ ............................................... G02B 6/00
(52) U.S. Cl. ........................................................ 385/135
(58) Field of Search ................................. 385/135, 136, 385/137, 138

(56) References Cited

U.S. PATENT DOCUMENTS

| | | | |
|---|---|---|---|
| 4,162,821 A * | 7/1979 | Schumacher | 385/65 |
| 4,330,171 A | 5/1982 | Malsot et al. | |
| 4,588,256 A * | 5/1986 | Onstott et al. | 385/87 |
| 4,717,233 A | 1/1988 | Szkaradnik | 385/98 |
| 5,042,902 A | 8/1991 | Huebscher et al. | |
| 5,157,751 A | 10/1992 | Maas | 385/99 |
| 5,469,522 A | 11/1995 | Fan | 385/98 |
| 5,748,819 A * | 5/1998 | Szentesi et al. | 385/60 |
| 6,007,258 A | 12/1999 | Marchitto et al. | |
| 6,086,704 A | 7/2000 | Kanai et al. | |
| 6,089,759 A | 7/2000 | Kawamura et al. | |
| 6,152,611 A | 11/2000 | Mardirossian | 385/99 |
| 6,779,931 B2 * | 8/2004 | Murata et al. | 385/98 |
| 2003/0091280 A1 | 5/2003 | Chang et al. | |

FOREIGN PATENT DOCUMENTS

| | | |
|---|---|---|
| EP | 0 434 212 | 6/1991 |
| EP | 0 745 874 | 12/1996 |
| EP | 1 028 334 | 8/2000 |
| GB | 2 038 016 | 7/1980 |
| GB | 2 303 467 | 2/1997 |
| WO | WO 2004/001476 | 12/2003 |

OTHER PUBLICATIONS

U.K. Search Report, Application No. GB0426930.4, dated Feb. 2, 2005.

* cited by examiner

*Primary Examiner*—Chandrika Prasad
(74) *Attorney, Agent, or Firm*—Moser, Patterson & Sheridan, L.L.P.

(57) ABSTRACT

A method and apparatus for terminating an end of an optical cable is disclosed such that coaxial tubes of the cable and fibers therein are all prevented from moving relative to one another. For some embodiments, the coaxial tubes crimp together by a mechanical crimp that compresses the outer tube onto the inner tube without roller crimping. A fiber retention subassembly crimps to one of the coaxial tubes, and an adhesive fills the fiber retention subassembly, thereby fixing the fibers therein and isolating tension from the ends of the fibers that extend from the fiber retention subassembly. The ends of the fibers of the optical cable connect with fibers of another optical cable or device by a fusion splice. A splice cover holds and/or seals the spliced section and prevents relative movement between the optical cables or the optical cable and the device at the spliced section.

17 Claims, 3 Drawing Sheets

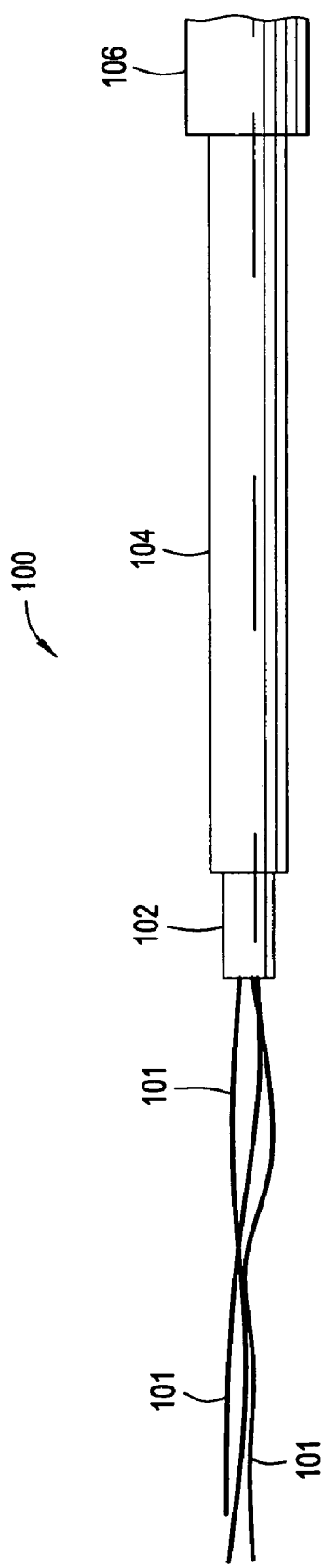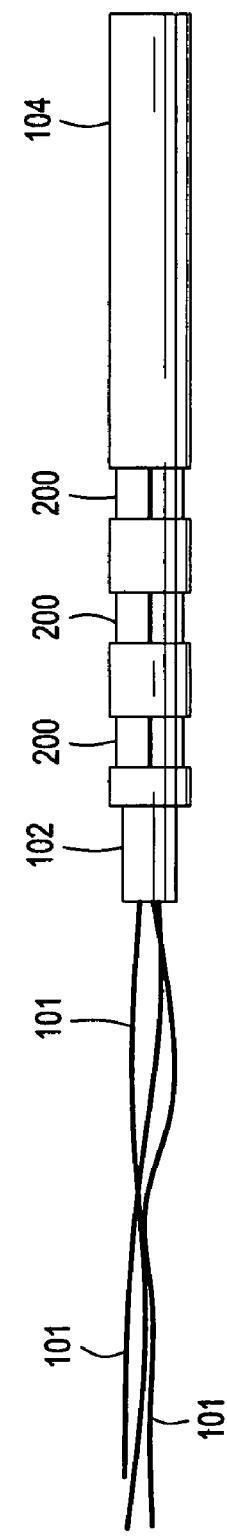
FIG. 1
FIG. 2

METHODS AND APPARATUS FOR FORMING AN OPTICAL CABLE SPLICE

BACKGROUND OF THE INVENTION

1. Field of the Invention

Embodiments of the invention generally relate to a splice for an optical cable. More particularly, the invention relates to a method and assembly for securing a spliced section of the optical cable.

2. Description of the Related Art

Optical sensors used in harsh environments such as within a wellbore of an oil or gas well communicate readings from within the wellbore to optical signal processing equipment located at the surface. Surface equipment transmits optical signals to the downhole optical sensors via optical cables which transmit return optical signals to an optical signal processor at the surface. The optical cables may run down the outer surface of one of the tubular strings in the wellbore such as production tubing and clamp thereto at intervals as is known in the art. Since the optical cable is exposed to the harsh effects of chemicals, high pressures, and high temperatures, the optical cables used in harsh environments typically consist of multiple layers. For example, these optical cables may have two concentric metal or alloy tubes disposed around an optical waveguide or fiber that transmits the optical signals.

A fusion splice between the ends of two fibers permits repairing a damaged section of the optical cable, coupling the optical cable to the optical sensor or surface equipment, or adding an additional length of optical cable. However, shifting of the concentric tubes or fibers therein relative to each other due to tensile loads or thermal expansion can damage the fiber that extends from the end of the optical cable. Thus, the components of the optical cable are typically secured to one another at the optical cable ends or termination points in an effort to prevent such relative movement. Further, a fusion splice creates a weak point in the fiber. A virgin fiber can accept approximately a 700,000 psi dynamic tensile load before breaking while the fiber at the splice can accept only approximately a 150,000 psi dynamic tensile load before breaking. This weakening of the fiber can effect long-term fiber reliability even under low static tensile loads. Therefore, tension on the fiber at the fusion splice must be isolated from tension forces applied to the rest of the fiber and optical cable.

A conventional method for preparing an optical cable for splicing is a complex and time consuming process. The previous method utilized roller crimping of the optical cable which could take at least an hour to prepare a single optical cable end due to the need for the operator to continually check the depth of the crimp. Even with such constant care, roller crimping subjects the process to operator variability. Further, roller crimping thins the outer coaxial tube wall making it subject to breaking and subsequent bond failure. A member crimped directly to the fiber in the previous method can cause attenuation or power loss in the fiber, especially in small (e.g. one eighth inch diameter) optical cable that has a thin buffer layer surrounding the fiber. Benefits of small diameter cable such as increased length of cable per spool, ease in handling, flexibility without kinking, and lower cost make small diameter cable preferable over larger diameter optical cable for many applications.

Therefore, there exists a need for a simplified method and assembly that secures a spliced section of any diameter optical fiber cable and fibers within the cable, preferably while eliminating or minimizing attenuation or power loss.

SUMMARY OF THE INVENTION

The invention generally relates to a method and assembly for terminating an end of an optical cable such that coaxial tubes of the cable and fibers therein are all prevented from moving relative to one another. For some embodiments, the coaxial tubes crimp together by a mechanical crimp that compresses the outer tube onto the inner tube without roller crimping. A fiber retention subassembly crimps to one of the coaxial tubes, and an adhesive fills the fiber retention subassembly, thereby fixing the fibers therein and isolating tension from the ends of the fibers that extend from the fiber retention subassembly. The ends of the fibers of the optical cable connect with fibers of another optical cable or device by a fusion splice. A splice cover holds and/or seals the spliced section and prevents relative movement between the optical cables or the optical cable and the device at the spliced section.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a view of an end of a coaxial cable having an inner tube and armor cut to accept a fiber retention subassembly.

FIG. 2 is a view of the end of the coaxial cable having crimps that secure the inner tube to the armor to provide a prepared cable end.

DETAILED DESCRIPTION OF THE PREFERRED EMBODIMENT

Figure 3:
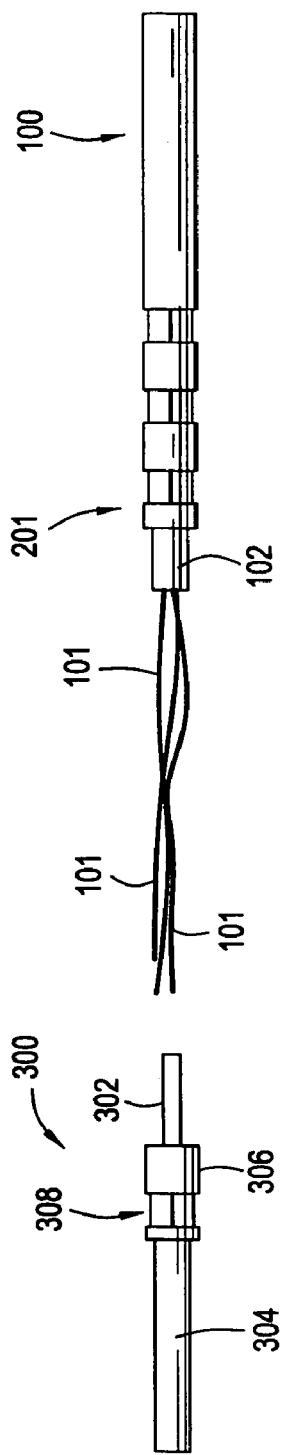
FIG. 3 is a view of the fiber retention subassembly aligned with the prepared cable end.

The invention generally relates to a method and assembly for securing a spliced section of an optical cable. FIG. 1 illustrates an end of a coaxial cable 100 having fibers 101, an inner tube 102 and armor 104 cut to accept a fiber retention subassembly (shown in FIG. 3). While the cable 100 is shown with the inner tube 102, the cable may not require an inner tube (e.g. the fibers 101 may be coated directly with a protective material). Therefore, the invention in some embodiments does not include the inner tube 102 of the cable 100. Additionally, the coaxial cable 100 may include a jacket 106 that covers and protects the armor 104. The jacket 106 is a larger diameter covering that may be made of nylon and clamped to downhole tubing. In order to withstand the environment downhole, inner tube 102 and armor 104 may be made of a metal or alloy.

To prepare the end for splicing, an end portion of the jacket 106 is cut and removed from the end of the coaxial cable 100. An operator can use a knife to cut and remove a long enough portion (e.g. six feet) of the jacket 106 such that the jacket 106 does not interfere during the splicing process. Next, a portion of the armor 104 is removed from the end of the coaxial cable 100. The operator can use a standard tube cutter to score the outside of the armor 104, which the operator can then flex to cleave the portion of the armor 104 being stripped. A sufficient length (e.g. twenty inches) of armor 104 is stripped from the coaxial cable 100 in order to leave enough fiber to form the splice. Next, the inner tube 102 is stripped from the coaxial cable 100. The inner tube 102 is stripped such that a length (e.g. fifteen hundredths inches) of the inner tube 102 extends past the armor 104. In operation, the operator can score the inner tube 102 with a knife file and flex the inner tube 102 to cleave the portion of the inner tube 102 being stripped.

As shown in FIG. 2, mechanical crimps 200 secure the inner tube 102 to the armor 104 to provide a prepared cable end 201. As with all crimps described herein, the operator can produce the crimps 200 using any available mechanical crimping tool that compresses the armor 104. While roller crimping may be used to perform the crimping, this time consuming and more sensitive procedure may not be required. Thus, a crimping tool having die inserts can be used to provide the crimps 200. Depending on the shape of the die inserts of the crimping tool, the crimps 200 may be a hex crimp, a circular crimp, or any other shape. While three crimps 200 are shown positioned along the outside of the armor 104, any number of crimps 200 may be used in succession to create a stronger holding force between the inner tube 102 and the armor 104. Prior to performing the splice or attaching a fiber retention subassembly (shown in FIG. 3), the operator may clean the fibers 101 using an alcohol or other solvent to remove any protective greases.

FIG. 3 illustrates a fiber retention subassembly 300 axially aligned with the prepared cable end 201. The fiber retention subassembly 300 includes a protective tube 302, a fill tube 304, and a section of mating armor 306 all concentrically arranged and crimped together by a crimp 308 in the mating armor 306. Preferably, the protective tube 302 is made of polyimide, and the fill tube 304 is made of a translucent or transparent polymer. However, the tubes 302, 304 may be made of any material such as a hard polymer or metal that is capable of withstanding the environment and protecting and securing the fibers 101. As shown, the crimp 308 secures the mating armor 306 at an end of the fill tube 304 such that a portion of the mating armor 306 extends past the end of the fill tube 304. A portion of the protective tube 302 is secured within the fill tube 304 by the crimp 308 while the remainder of the protective tube 302 extends beyond the end of the fill tube 304 that has the mating armor 306 thereon. The fiber retention subassembly 300 may be formed either on location where the coaxial cable 100 is located or manufactured and preassembled offsite.

Figure 4:
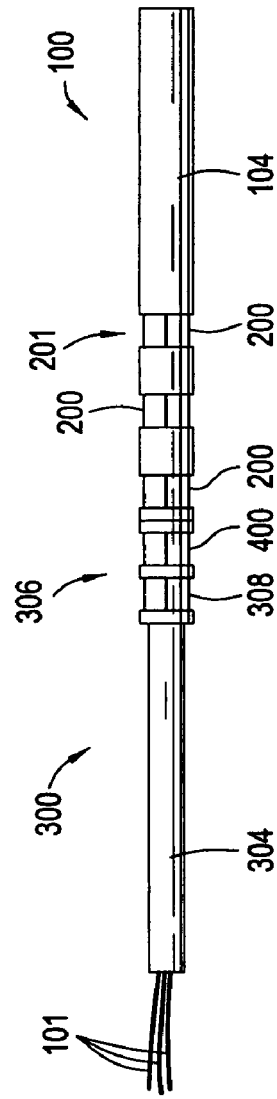
FIG. 4 is a view of the fiber retention subassembly positioned on the prepared cable end and crimped in place.

FIG. 4 shows the fiber retention subassembly 300 positioned on the prepared cable end 201 and crimped in place by a crimp 400. In order to position the fiber retention subassembly 300 on the prepared cable end 201, the fibers 101 are run through the inner bores of the protective tube 302 (not visible) and the fill tube 304. The portion of the protective tube 302 that extends beyond the fill tube 304 inserts into the inner diameter of the inner tube 102 (not visible) of the prepared cable end 201. In this manner, the protective tube 302 protects the fibers 101 from any burrs on the end of the inner tube 102 along where the inner tube 102 was cut. The mating armor 306 of the fiber retention subassembly 300 butts against the cut end of the armor 104 of the prepared cable end 201 and surrounds the exposed portion of the inner tube 102 of the prepared cable end 201. Thus, the crimp 400 connects the fiber retention subassembly 300 to the prepared cable end 201 by crimping the mating armor 306 against the outside of the inner tube 102 of the prepared cable end 201.

Figure 5:
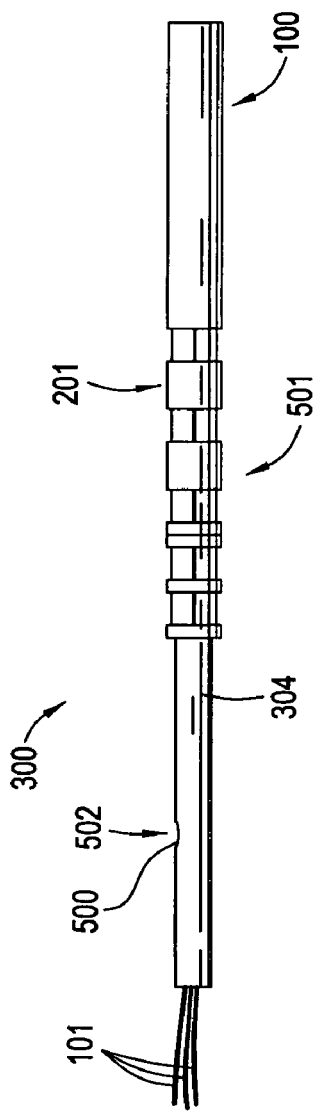
FIG. 5 is a view of the fiber retention subassembly having an adhesive being injected into it to provide a retained fiber cable end.

FIG. 5 illustrates an adhesive, shown diagrammatically as arrow 502, injecting into a fill port 500 of the fill tube 304 to provide a retained fiber cable end 501 once the adhesive cures. If the fill tube 304 does not include a fill port 500, the adhesive 502 may inject directly into the exposed end of the fill tube 304. Applying heat or light to the adhesive cures the adhesive and secures the fibers 101 relative to the fill tube 304 that is secured to the prepared cable end 201. Thus, the portions of the fibers 101 that extend from the retained fiber cable end 501 are isolated from forces applied to the fibers opposite the fill tube 304. When the adhesive 502 is photocurable, the fill tube 304 is made of a translucent or transparent material that passes light from an ultra violet (UV) lamp.

Figure 6:
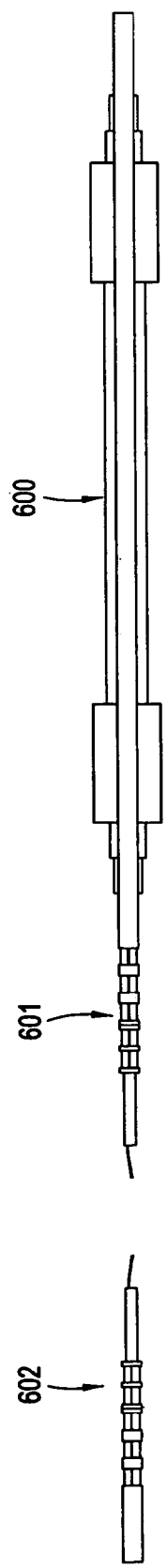
FIG. 6 is a partial section view of a splice cover slid over a first retained fiber cable end and adjacent a second retained fiber cable end.
Figure 7:
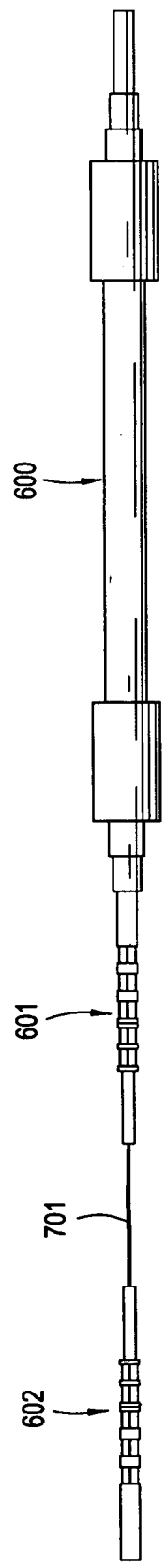
FIG. 7 is a view of a fusion splice and recoat of fibers extending from the first and second retained fiber cable ends.

FIG. 6 shows a partial section view of a splice cover 600 that protects the spliced fibers and further prevents tension force on the fibers at the splice. In operation, the splice cover 600 slides over a first retained fiber cable end 601 such as the retained fiber cable end 501 described above with reference to FIG. 5. The first retained fiber cable end 601 aligns adjacent a second retained fiber cable end 602. The second retained fiber cable end 602 may be a lead from a sensor, instrument, gauge, or connector and may actually be a cable end that has not been prepared as a retained fiber cable end as described herein. As shown in FIG. 7, a fusion splice connects the ends of fibers 701 extending from each cable end 601, 602. Known techniques and commercially available equipment may be utilized to form the fusion splice that connects the ends of the fibers 701. Making the fusion splice generally involves stripping the coating from the fibers, cleaning the fibers, cleaving the fibers to get a flat polished end, precisely aligning and heating the ends to join the fibers, and recoating the fibers along the spliced portion.

Figure 8:
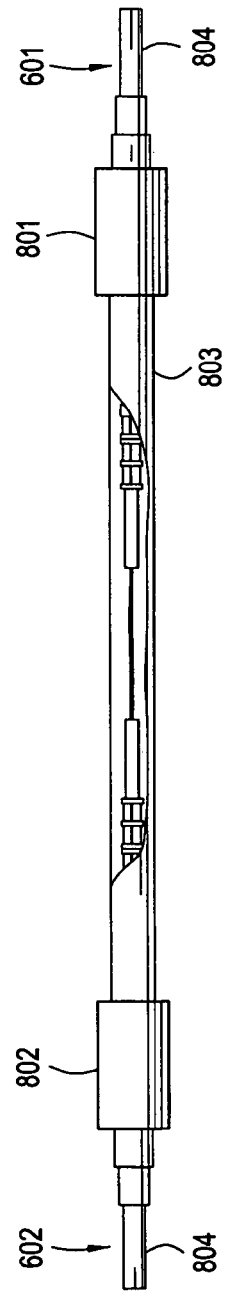
FIG. 8 is a partial section view of the splice cover secured to a portion of both the first and second retained fiber cable ends to provide a completed cable splice.

After the fusion splice and recoating of the fibers 701, the splice cover 600 slides across cable ends 601, 602 as illustrated in FIG. 8. The splice cover 600 includes a union fitting cut into a first half 801 and a second half 802 with a section of tubing 803 welded between the two halves 801, 802 of the union fitting. Thus, each half 801, 802 of the union provides a compression fitting. The length of the tubing 803 covers the excess fiber necessary for the fusion splicing and permits fiber stowage if necessary. Alternatively, the splice cover 600 may only include the first half 801 of the union welded to the tubing 803 that has an opposite end exposed for subsequent coupling via a weld, thread, or otherwise to a connector or other device. As shown, the splice cover 600 secures to a portion of both the first and second retained fiber cable ends 601, 602 with the compression fittings 801, 802 that tighten against an outside surface of armor 804 of the cable ends 601, 602 to provide a completed cable splice. In this manner, the splice cover 600 holds the armor 804 to prevent relative movement between the cable ends 601, 602 across the fused fibers. The splice cover 600 may additionally seal the stripped portions of the cable ends 601, 602 from the outside environment.

The lengths of the portions of jacket 106, armor 104, and inner tube 102 that are stripped from the end of the coaxial cable 100 are not fixed and depend on the lengths of the splice cover 600, the fiber retention subassembly 300, the portion of the mating armor 306 of the fiber retention subassembly 300 that extends beyond the fill tube 304, and the length of fiber 101 needed to complete the fusion splice. Thus, the lengths given are only examples for one embodiment.

While the foregoing is directed to embodiments of the present invention, other and further embodiments of the invention may be devised without departing from the basic scope thereof, and the scope thereof is determined by the claims that follow.

What is claimed is:

1. A method of preparing an end of an optical cable, comprising:
    exposing a length of inner tubing extending from cable armor located at the cable end;
    exposing a length of one or more optical waveguides extending from the inner tubing;
    securing the cable armor to the inner tubing;
    feeding the optical waveguides through protective tubing of a retention assembly, wherein a portion of the protective tubing extends from an end of the retention assembly surrounded by mating armor;
    securing the mating armor of the retention assembly to the inner tubing; and
    filling at least a portion of the retention assembly with an adhesive, thereby securing a portion of the optical waveguides to the retention assembly.

2. The method of claim 1, wherein securing the cable armor to the inner tubing comprises crimping a portion of the cable armor that coaxially surrounds the inner tubing to the inner tubing.

3. The method of claim 1, wherein securing the mating armor of the retention assembly to the inner tubing comprises crimping a portion of the mating armor that coaxially surrounds the inner tubing to the inner tubing.

4. The method of claim 1, wherein feeding the optical waveguides through the protective tubing positions a portion of the protective tubing into a portion of the optical cable.

5. A method of preparing an end of an optical cable, comprising:
    providing the end of the optical cable having at least one optical waveguide extending from the end;
    feeding the optical waveguides through protective tubing of a retention assembly, wherein a portion of the protective tubing extends from an end of the retention assembly surrounded by mating armor and positions within a portion of the optical cable; and
    securing the mating armor of the retention assembly to inner tubing of the optical cable.

6. The method of claim 5, wherein securing the mating armor of the retention assembly to the inner tubing comprises crimping a portion of the mating armor that coaxially surrounds the inner tubing to the inner tubing.

7. The method of claim 5, further comprising securing the cable armor to the inner tubing.

8. A method for forming a cable splice, comprising:
    providing a first optical waveguide extending from an end of an optical cable and a second optical waveguide extending from a member;
    fixing the first optical waveguide within a fiber retention subassembly coupled to a portion of the optical cable;
    fusing the first and second optical waveguides to form a splice; and
    preventing relative movement between the optical cable and the member at the splice by tightening a compression fitting of a splice cover to the optical cable, wherein the splice cover comprises a tube that covers the splice and secures to the member.

9. The method of claim 8, wherein fixing the first optical waveguide comprises filling at least a portion of the fiber retention subassembly with an adhesive.

10. The method of claim 8, wherein the member is another optical cable.

11. A fiber retention subassembly for use on an end of an optical cable, comprising:
    a section of armor;
    a fill tube coupled to the armor, wherein the armor extends from an end of the fill tube to provide a mating end to couple with a corresponding mating end of a prepared cable end; and
    a protective tube coupled to the end of the fill tube, the protective tube having an outer diameter sized to position inside a portion of the optical cable.

12. The fiber retention subassembly of claim 11, wherein the armor, the fill tube and the protective tube are coupled together concentrically by a crimp in the armor.

13. The fiber retention subassembly of claim 11, wherein the fill tube comprises a polymer that is at least translucent.

14. A splice cover for securing an end of an optical cable to a member, comprising:
    a compression fining securable to an outer surface of the optical cable; and
    a tube coupled to the compression fitting and having a length that extends to the member, the tube securable to the member to surround a splice in an optical waveguide.

15. The splice cover of claim 14, wherein the compression fitting provides a seal at the outer surface of the optical cable.

16. The splice cover of claim 14, wherein the splice cover prevents relative movement between the optical cable and the member at the splice.

17. The splice cover of claim 14, wherein the member is another optical cable that the tube is coupled to by another compression fitting.

* * * * *

UNITED STATES PATENT AND TRADEMARK OFFICE
CERTIFICATE OF CORRECTION

| | | |
|---|---|---|
| PATENT NO. | : 6,931,194 B2 | Page 1 of 1 |
| APPLICATION NO. | : 10/730716 | |
| DATED | : August 16, 2005 | |
| INVENTOR(S) | : Dowd et al. | |

It is certified that error appears in the above-identified patent and that said Letters Patent is hereby corrected as shown below:

Column 6, Claim 14, Line 40: Change "fining" to --fitting--

Signed and Sealed this

Sixteenth Day of January, 2007

JON W. DUDAS
*Director of the United States Patent and Trademark Office*